INVENTORS
SAM A. JONES
ERIC H. REICHL
BY
ATTORNEY

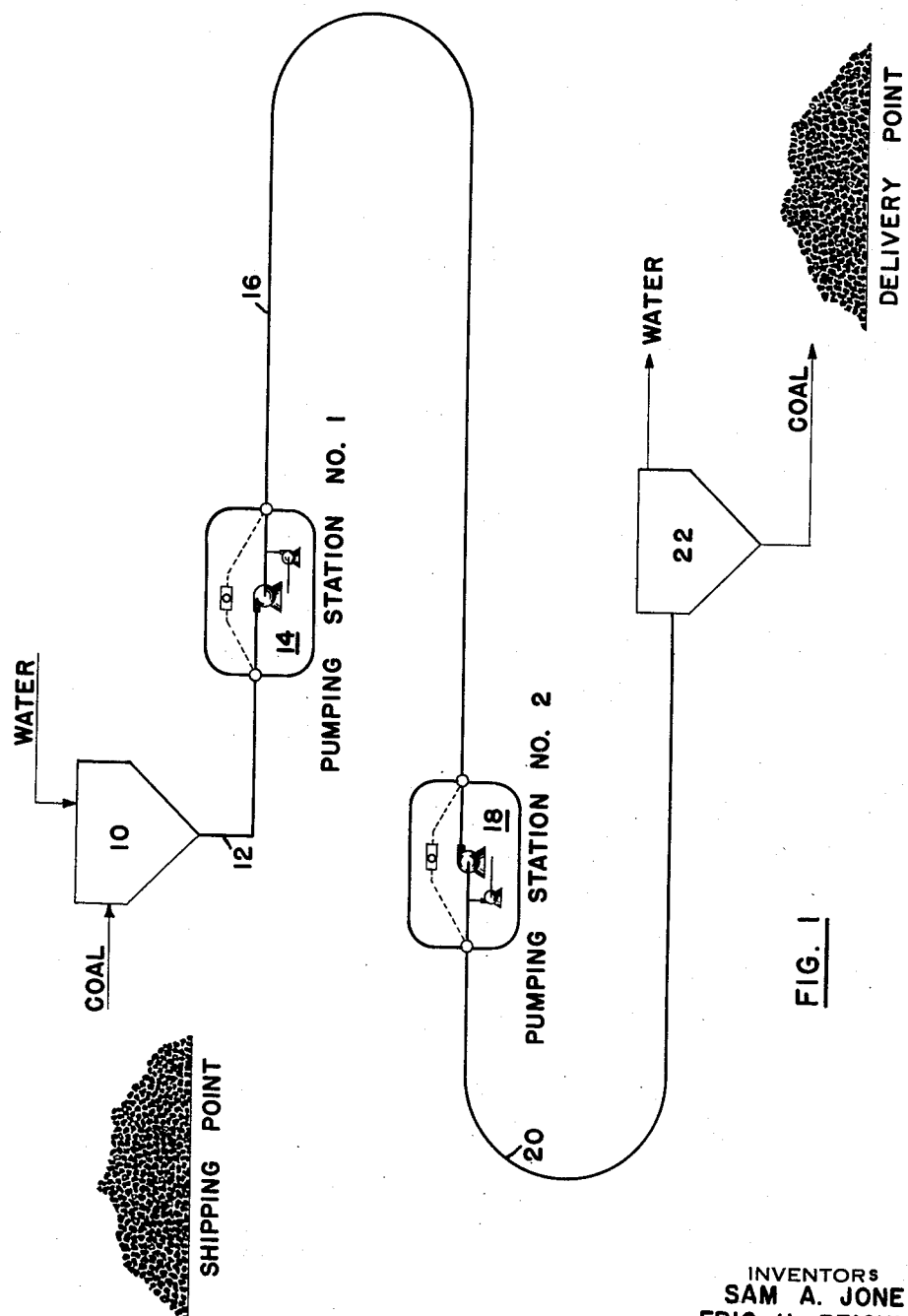

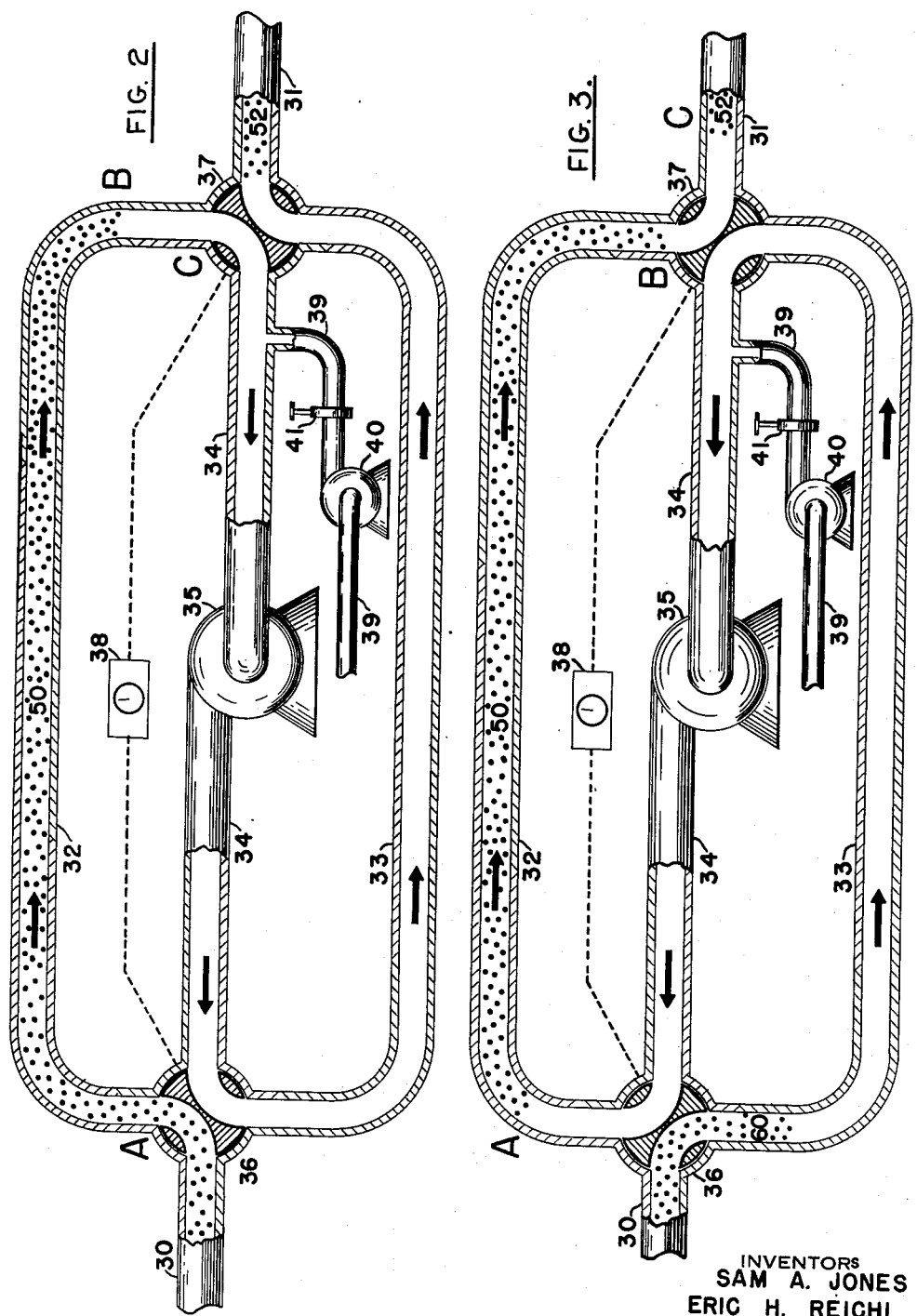

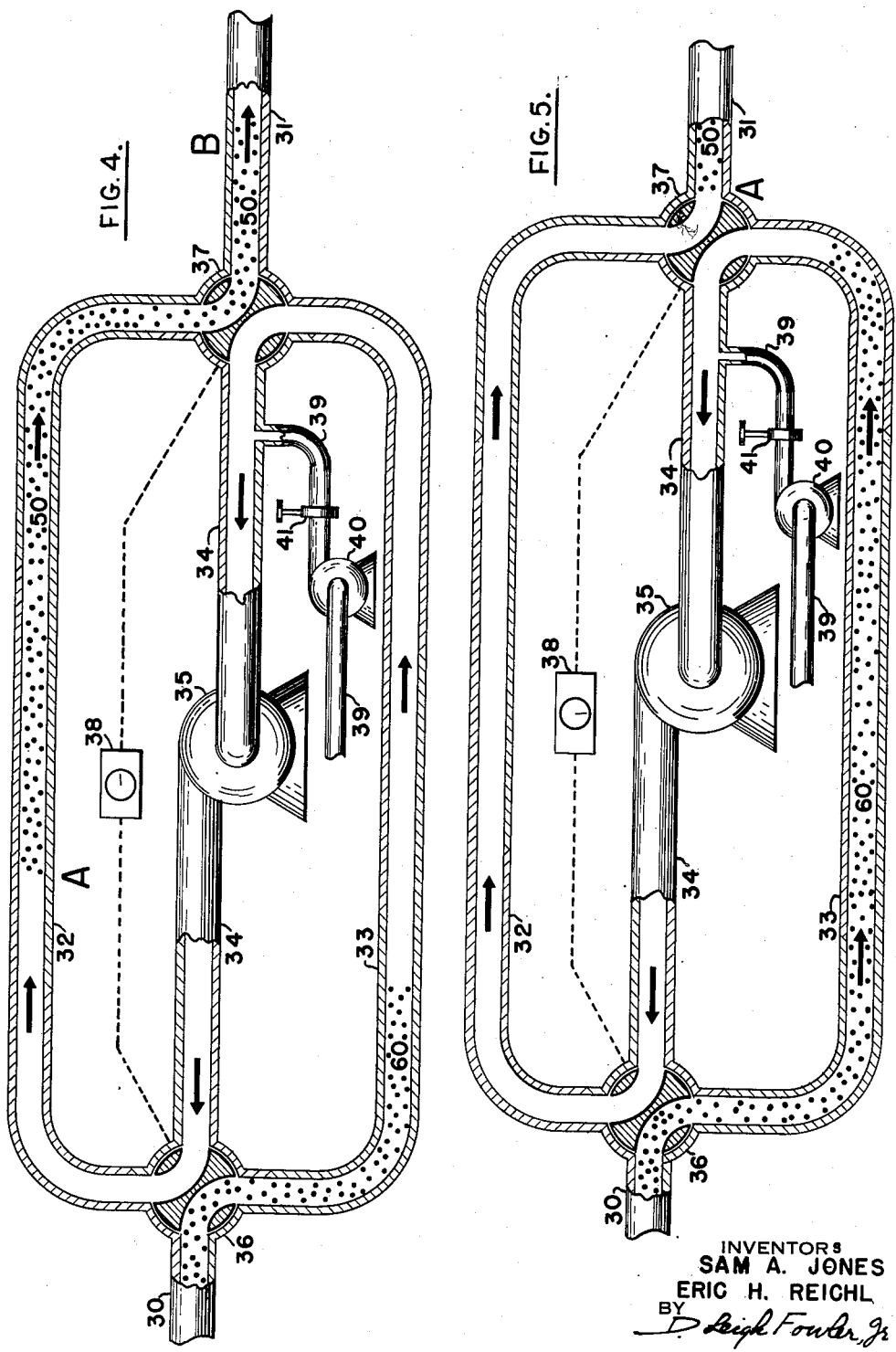

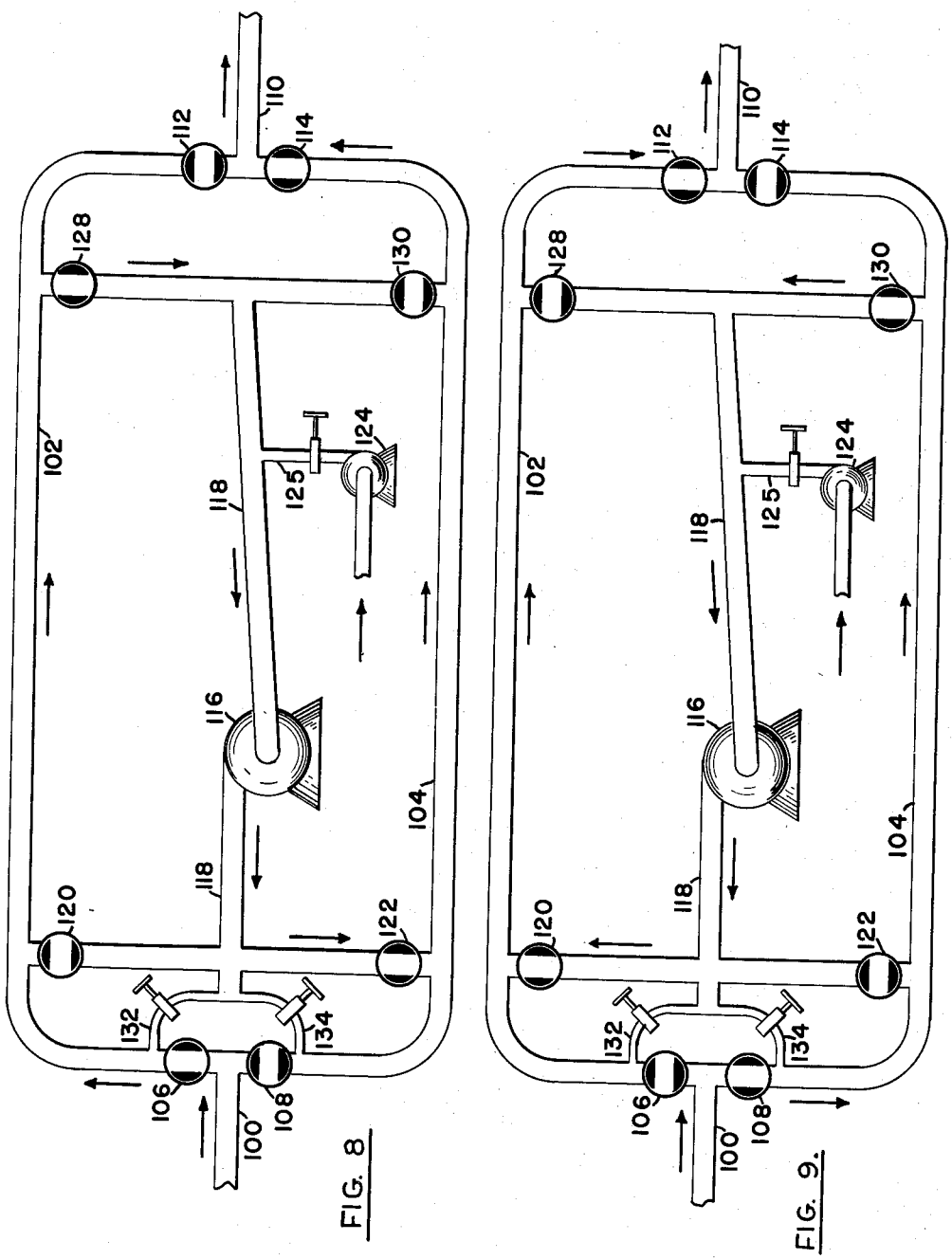

Patented Mar. 16, 1954

2,672,370

UNITED STATES PATENT OFFICE 2,672,370

TRANSPORTATION OF SOLIDS THROUGH PIPE LINES

Sam A. Jones and Eric H. Reichl, Pittsburgh, Pa., assignors to Pittsburgh Consolidated Coal Company, Pittsburgh, Pa., a corporation of Pennsylvania Application January 5, 1951, Serial No. 204,628

14 Claims. (Cl. 302—14)

This invention relates to the art of transporting solids through pipelines, and, more particularly, to the transportation of subdivided solids, such as coal, suspended in a liquid medium, such as water, through long distance pipelines.

The transportation of coal through pipelines was long ago conceived as having attractive possibilities from the standpoint of convenience and reduced costs. Substantial effort has been directed toward commercial realization of these attractive possibilities by the use of water as a carrier for the coal. While some success has been achieved in transporting coal over short distances via pipelines, to the best of our knowledge, there exists today no coal pipeline which is adapted to transport coal for distances up to one hundred miles or more.

Reference to the prior art in the field together with actual experimental studies soon establishes that there are two serious problems responsible for the previous lack of success in the development of long distance coal pipelines. The first is the tendency of the coal to settle out of suspension. Any appreciable settling out of the solids soon renders the pipeline inoperable. There exists, however, for each particular system a critical minimum flow velocity above which no appreciable particle settling occurs. But it is necessary that the flow velocity not substantially exceed this critical velocity for otherwise the power costs of pumping the coal and water will reduce the economic attractiveness of the pipeline. Furthermore the flow of the carrier medium throughout the length of the pipeline should be smooth, uninterrupted and substantially constant to minimize settling tendencies of the suspended coal.

The establishment and maintenance of this desirable condition of uniform and continuous flow at constant velocity of the carrier medium leads directly to the second and major problem, that is, the provision of a pump that is adapted to develop the high pressure head required to transfer the coal-water suspension or slurry over long distances. By developing a high head the number of pumps in the entire pipeline can be reduced to an acceptable minimum. This pump must be adapted to raise the pressure head of the liquid medium without reducing the velocity of liquid flow below that at which settling will occur. Furthermore, and this is a serious limitation inherent in conventional mechanical pumps, the pump must be one which is not affected by the abrasive action of the slurry. Otherwise the potential savings of the pipeline will be largely offset by the replacement cost of the pump. It is also important that the pump be one which will not effect appreciable attrition of the solid particles in the slurry.

The primary object of this invention is to provide an improved pipeline system for the transportation of solids in which the solids suspended in a liquid are moved at a substantially constant velocity throughout the length of the pipeline.

Another object of the present invention is to provide an improved pumping unit for raising a fluid from one pressure level to a higher pressure level.

A further object of our invention is to provide a pumping unit for slurries in which the slurry is advanced unidirectionally and continuously at substantially constant velocity by means of a separately pressurized recirculating liquid.

In accordance with our invention, an improved pipeline system is provided for the transfer of solids in the form of a suspension of the solids in a liquid medium, more commonly referred to as a slurry. This system comprises a pipeline proper in which are interposed one or more pumping stations for raising the pressure of the slurry to a high level. Each pumping station includes two pipeline legs which are adapted to receive periodically and alternately a predetermined quantity or "slug" of slurry from a low pressure point in the pipe line proper. Associated with the pipeline legs in each pumping station is a continuously recirculating pressurized liquid system which is adapted to deliver a predetermined quantity or "slug" of pressurized liquid to a pipeline leg immediately following the receipt by that leg of a slug of slurry. The latter is thereupon forced from the leg into the high pressure side of the pipeline proper and thereafter the slug of pressurized liquid is recirculated to a mechanical pressurizing unit. The operation of each pipeline leg in this manner is synchronized with that of the other leg so as to assure substantially continuous delivery of slurry to the high pressure side of the pipeline. Furthermore, by employing pipeline legs of the same internal diameter as that of the main pipeline, the same velocity of slurry flow is established and maintained along the entire length of the pipeline. Any particular operating velocity may be readily attained by proper design of the recirculating pressurized liquid system.

Other objects and advantages of our invention will become apparent upon reference to the following detailed description of a preferred embodiment of our invention and to the accompanying drawings in which:

Figure 1 is a diagrammatic flow sheet of a system for transporting coal-water slurry in accordance with the present invention;

Figure 2 is a drawing, partly diagrammatic and partly cross sectional, showing an embodiment of a pumping station for elevating the pressure of the coal-water slurry;

Figure 3 is a drawing, partly diagrammatic and partly cross sectional, of the pumping station shown in Figure 2 in a different stage of operation;

Figure 4 is a drawing, partly diagrammatic and partly cross sectional, of the pumping station shown in Figure 2 in still a different stage of operation;

Figure 5 is a drawing, partly diagrammatic and partly cross sectional, of the pumping station shown in Figure 2 in a further stage of operation;

Figures 8 and 9 are drawings partly diagrammatic and partly cross sectional, of another modified embodiment of the pumping station shown in Figure 2.

Figure 6:
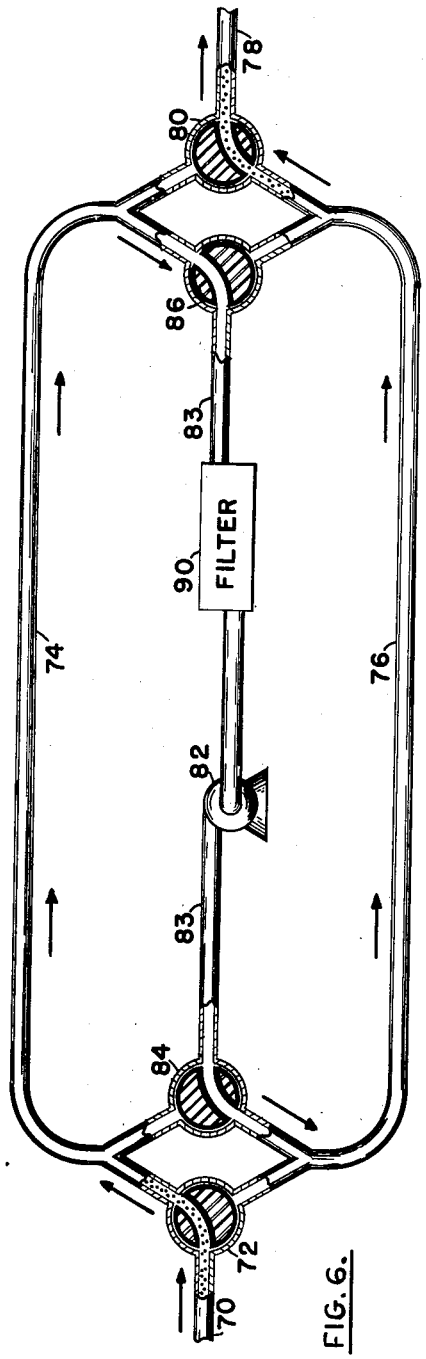
Figures 6 and 7 are drawings, partly diagrammatic and partly cross sectional, of a modified embodiment of the pumping station shown in Figure 2.

Referring specifically to Figure 1 in the drawings, there is shown a pipeline system for transporting coal in the form of a water slurry over distances of up to one hundred miles or more. In this system, coal and water are delivered to a slurry preparation tank 10 in which they are thoroughly mixed to form a slurry of uniform consistency. From the preparation tank the slurry is conducted through a pipeline 12 to the inlet and low pressure side of a pumping station 14. The necessary head for moving the slurry at the desired velocity is provided by this pumping station, which will be described in detail later.

From the high pressure side of the pumping station 14, slurry is conducted through a pipeline 16 to a second pumping station 18 which corresponds in design and mode of operation to the first pumping station 14. The coal-water slurry is delivered from the second pumping station 18 through a pipeline 20 to a slurry separation tank 22 from which the coal is separately recovered.

The size of the coal, the concentration of the slurry, the diameter of the pipe, and the velocity of the slurry through the pipeline are suitably correlated to maintain the coal in suspension throughout the entire length of the pipeline, and to produce the desired pipeline capacity. For optimum commercial operation, the size of the coal should be between 40 mesh x 0 and ⅜ inch x 0. The concentration of the slurry preferably lies between 35 and 75 per cent by weight of solids. The diameter of the pipeline is substantially the same throughout the system in order to avoid sudden velocity drops resulting in settling of the solids. The velocity of flow through the system is such as to insure that no solids settle out and will in general under the conditions given above range from 3 to 10 feet per second.

For example, with a size consisting of ⅜ inch x 0 and a slurry concentration of 50 per cent in a pipeline of 12 inches diameter, a velocity of at least 6 feet per second should be maintained. Such a system will deliver approximately six thousand tons of coal per day. To transport this much coal over a distance of one hundred miles employing two identical pumping stations requires the development of a head of about 1250 pounds per square inch at each station. To the best of our knowledge no mechanical pump is today commercially available for developing such pressures and withstanding the tremendous eroding effects of a coal slurry for any commercially practical length of time.

Figures 2, 3, 4, and 5 of the drawings show an embodiment of a pumping unit for raising the pressure of a fluid without substantially interrupting its flow and without circulating it through a mechanical pump. This pumping unit corresponds to the pumping stations 14 and 18 shown in Figure 1 and will be described in its application to the transportation of a slurry composed of coal and water. A pipe 30 which is part of the main pipeline is adapted to carry low pressure slurry to the pumping unit. A pipe 31 of substantially the same diameter as pipe 30, and also a part of the main pipeline, is adapted to carry high pressure slurry from the pumping unit. Two pipe sections 32 and 33 of substantially the same length and diameter are arranged between the ends of pipes 30 and 31 in such a manner that slurry may be passed through one or the other of the two pipe sections into pipe 31. The diameter of the two pipe sections 32 and 33 is preferably the same as that of pipes 30 and 31. However, while it may not substantially exceed that of the main pipeline, the diameter of the two sections may be less than that of the pipeline proper as will be shown in the discussion of the operation of the pumping unit.

A pipe 34 is provided for carrying pressurized water to one or the other of the two pipe sections 32 and 33 and for receiving water returning therefrom. A high pressure water pump 35 which is adapted to operate continuously is disposed in pipe 34 for raising the pressure of the water returning from the pipe sections. The diameter of pipe 34, while preferably the same as that of the pipe sections 32 and 33 is not necessarily the same since only water is carried by this pipe.

A motor-operated four-way valve 36 is provided for directing the flow of low pressure slurry from pipe 30 into either pipe section 32 or pipe section 33 and at the same time for directing the flow of high pressure water from pipe 34 into that pipe section which is not receiving low pressure slurry. A similar motor-operated four-way valve 37 is provided at the outlet ends of the pipe sections 32 and 33 for directing the flow of high pressure slurry from one of the sections into pipe 31 and the flow of returning water to the pump 35. Both valves are designed to pass fluid at all times and are provided with passages having substantially the same diameter as that of the pipe sections. It is to be understood that the distance traversed by the liquid through the valves is negligible compared to the lengths of the pipe sections.

A cyclic timer 38 of any suitable conventional design is provided for periodically and simultaneously changing the position of the two valves 36 and 37 by actuation of their respective motors. The periodicity of the valve changes depends upon the length of the pipe sections 32 and 33 and the velocity of the fluid flowing. The latter are preferably selected to permit a reasonable time cycle between valve changes to thereby reduce wear in the valves. For purposes of illustration to provide a cycle of flow through each leg of from two to five minutes at a velocity of 3 to 10 feet per second, the length of legs 32 and 33 may be between approximately 0.05 and one mile.

The pumping unit is also provided with a make-up water system comprising a pipe 39 leading from any suitable source of water to pipe 34. A small water pump 40 is provided for continuously pumping water under the control of a valve 41 into pipe 34.

The operation of the pumping unit will now be described. Referring specifically to Figure 2 of the drawings, with the valves 36 and 37 positioned as shown, low pressure slurry is drawn into leg 32 behind water being returned to the low pressure side of pump 35 through pipe 34. The slurry is allowed to advance into section 32 until a slug of slurry of a length A—B has been introduced. This slug is identified by the numeral 50. At the same time, high pressure water from pump 35 is directed into leg 33 to thereby force a previously introduced slug of slurry into the high pressure line 31. As shown in Figure 2, this slug of slurry, designated by the numeral 52, has just left the valve 37. A small slug of water remains in leg 32 ahead of slug 50. Its length is indicated by the letters B—C. At this point in the operation of the pump, valves 36 and 37 are actuated to change their respective positions to that shown in Figure 3. During the changing of the valves, valve 36 operates in slurry and valve 37 operates in water. The amount of water contained in slug B—C is regulated to insure that slug 50 does not reach valve 37 until it has assumed its new position as shown in Figure 3. Thus no slurry can possibly pass to the water pump 35.

Referring specifically to Figure 3 which shows the pump immediately following the change of the valves from the position shown in Figure 2, it will be seen that slug 50 has just reached the valve 37 at the time the latter has changed its position to permit the slurry to pass into the discharge line 31. During the changing of the valve 37, an amount of water equal to that contained in the slug B—C has preceded the slug 50 into the discharge line. This water in the discharge line will comprise some water from the leg 32 and some from the leg 33. During this same interval of time when valves 36 and 37 are changing their position, slurry from the pipe 30 has been diverted into leg 33 and high pressure water from the water pump 35 has been directed into leg 32 immediately behind the slug 50 to thereby force the slug 50 and the small slug of water B—C in advance of slug 50 through valve 37. The slurry entering leg 33 is drawn therein by the water returning to the suction side of the water pump 35. In order to replace the water discharged from the pump between slurry slugs into the discharge line 31, make-up water is fed into the recirculating water system by means of the pump 40 through valved pipe 39. The amount of water so fed governs the amount of water from the pump into pipe 31 and is at least equal to the velocity of fluid flow in the legs 32 and 33 multiplied by the valve turning time. Thus it will be seen that the ratio of the lengths of slurry A—B and of water B—C is extremely large and can be made so large by proper selection of length of pipes 32 and 33 as to make the intervening water slugs negligible in amount.

Figure 4 of the drawings shows the pump at a stage substantially midway in the cycle following the changing of the valves to the position shown in Figure 3. Slug 50, as will be seen, is being discharged from leg 32 by the advancing stream of high pressure water while a new slug of slurry is being drawn into leg 33.

Referring to Figure 5 of the drawings, a new slug 60 has been drawn into leg 33 corresponding in amount to slug 50 shown in Figure 2. At the same time slug 50 has been forced completely out of the pump by high pressure water to a point at the exit port of valve 37. At this time, the cyclic timer 40 actuates the valves 36 and 37 to change their position back to that shown in Figure 2. The movement of slug 60 through leg 33 is accomplished in the same manner as described for slug 50. By thus periodically changing the position of the two valves 36 and 37, a substantially continuous stream of slurry is elevated to a high pressure and moved at substantially constant velocity through the system.

For the purposes of slurry transportation, the diameter of the pipe legs 32 and 33 should be the same as that of the pipe 30 and 31 respectively. It is thus possible to maintain a constant velocity of the slurry throughout the entire system. Some deviation from this preferred condition can, of course, be tolerated depending on the settling tendency of the solids being transported. If the velocity established in the pipeline proper is very close to the critical velocity, that is, the velocity below which settling would occur, then the diameter of the pump legs 32 and 33 should not be larger than that of the pipeline but may be somewhat smaller. By making the pipeline legs smaller, a higher velocity is maintained in the pump but the subsequent velocity drop in the discharge line would not be serious so long as the discharge velocity is still equal to or exceeds the critical velocity.

Figure 7:
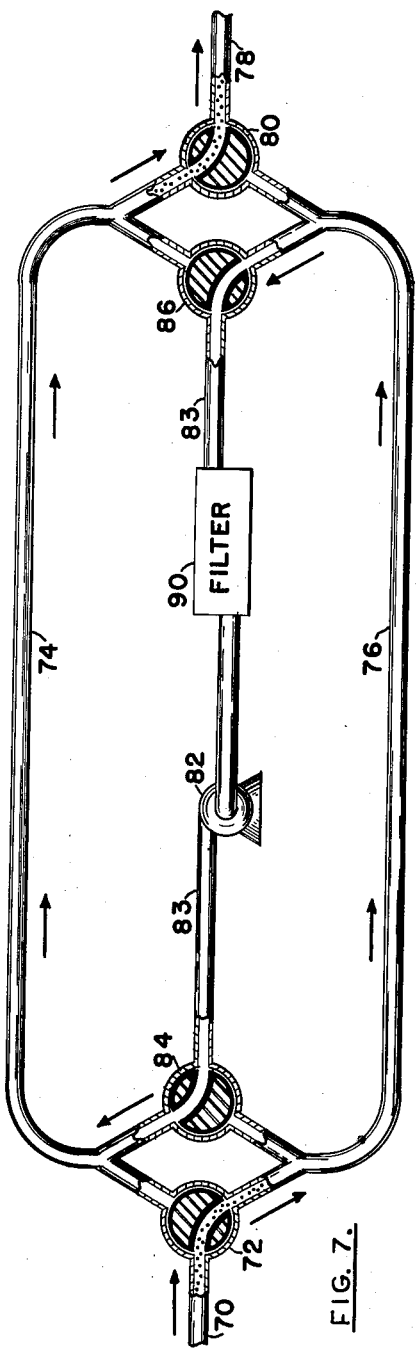

Referring to Figures 6 and 7 of the drawings, a modification of the pumping unit is disclosed in which four three-way valves are used instead of the two four-way valves illustrated in Figure 2 for controlling fluid flow. A further modification is the use of a filter instead of a make-up water system. The pumping unit so modified comprises a low pressure slurry inlet pipe 70 which is adapted to feed slurry upon operation of valve 72 into either leg 74 or 76. Slurry is discharged into a high pressure line 78 from leg 74 or 76 upon proper positioning of valve 80. High pressure water is forced by a pump 82 through a pipe 83 into either leg 74 or 76 depending upon the position of valve 84. Low pressure water from the legs 74 and 76 is returned to the pump 82 through valve 86. In this system, no make-up water is supplied to the pressurized recirculating water system but instead a filter 90 is provided which removes from the water any of the solids that might be carried through valve 86 during its turning to a new position. The valves are all controlled by a cyclic timer (not shown) so that they change their position simultaneously at definite intervals. These intervals are determined by the time required for a slug of slurry to fill one of the legs 74 and 76 up to the valve 80. As the valve 80 turns to permit slurry to discharge into pipe 78 some slurry will pass through valve 86 because of the finite time required to turn the valve. While this is a small amount in proportion to the total slurry transferred through the system pump, over a period of time if not removed from the water system, the water pump 82 would soon be eroded to the point of inoperativeness. The continuously operating filter 90 removes the solids from the water to protect the pump. If desired, a settling pond may be employed instead of a conventional type of continuous filter. That is, the returning low pressure water may be passed to a pond where the solids settle to the bottom and clear water is drawn from the top by the pump 82. Figure 6 shows the four valves in an operative position to direct low pressure slurry into pipe section 74 and high pressure slurry from pipe section 76 into pipe 78. Figure 7 shows the four valves in an operative position to direct low pressure slurry into pipe section 76 and high pressure slurry from pipe section 74 into pipe 78. The operation of this modified pump is otherwise the same as that of the preferred embodiment.

Referring to Figures 8 and 9, a second modification of the pump is shown in which eight valves are employed instead of the two four-way valves of the preferred embodiment. An additional feature is disclosed for insuring that all valves operate in water and none in slurry. This modified pumping unit comprises an inlet pipe 100 from which slurry is circulated alternately into legs 102 and 104 depending upon the position of on-and-off valves 106 and 108 respectively. Slurry from one or the other of the two legs 102 and 104 is discharged into a high pressure line 110 depending upon the position of on-and-off valves 112 and 114 respectively. High pressure water is forced by a pump 116 through a conduit 118 into either leg 102 or 104 depending upon the position of on-and-off valves 120 and 122. Make-up water is supplied to the recirculating water system by means of a pump 124 through a valved conduit 125. Water is returned to the pump 116 from one or the other of the legs 102 and 104 through a pipe 118 depending upon the position of on-and-off valves 128 and 130 respectively. The eight named on-and-off valves are controlled by a cyclic timer, not shown, to operate simultaneously to direct low pressure slurry into one leg while high pressure water is directed into the other leg and to permit slurry to discharge from one leg into the pipe 110 while water is being returned from the other leg to the water pump 116 in the manner described in connection with the preferred embodiment.

Figure 8 shows the respective positions of the eight valves which permit flow of low pressure slurry into leg 102 behind low pressure water returning to the pump 116 through valve 128 while high pressure slurry is forced from leg 104 through valve 114 by pressurized water admitted through valve 122. Figure 9 shows the alternate arrangement of valves in accordance with which leg 102 becomes the high pressure leg and leg 104 the low pressure leg.

As described so far, all the valves with the exception of valves 106 and 108 will turn in water at all times, but the latter operate in slurry with resulting wear through erosion. Accordingly, this modified embodiment provides for back flushing valves 106 and 108 with water immediately preceding their change from an open to a closed position. Valved conduits 132 and 134 are provided to conduct high pressure water from pipe 118 into legs 102 and 104 respectively. These valved conduits 132 and 134 are designed to open momentarily in response to a timer, not shown, to pass a small amount of water sufficient to force the low pressure slurry passing through valves 106 and 108 as the case may be back through the valve just before the cyclic timer actuates the valve to turn to a closed position. Thus the valve will turn in water and remain in water until it is again actuated to an open position.

While the operation of the pumping station has been described in connection with the transportation of coal-water slurry, it should be understood that such a pump may be utilized wherever it is desired to elevate a fluid, whether liquid or gaseous, to a higher pressure without passing it through a mechanical pump because of corrosive, erosive, or radioactive effects. In other words, the pump is adapted to be used for raising the pressure of any fluid to a higher pressure by means of a pressurized liquid without altering its direction of flow or its velocity. The pump is also adapted as will be apparent to raise the pressure of a liquid by means of a pressurized gas instead of a pressurized liquid.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. The method of raising the pressure of a fluid by means of a pressurized liquid which comprises continuously recycling a stream of liquid through a pressurizing zone, diverting the flow of said liquid from said pressurizing zone alternately and at regular intervals through two transfer zones of equal volume, returning said liquid from one transfer zone to said pressurizing zone while the other transfer zone is receiving liquid from said pressurizing zone, whereby each of said transfer zones operates successively as a low pressure zone and a high pressure zone, introducting a predetermined quantity of fluid into the transfer zone operating as a low pressure zone, concurrently discharging a corresponding predetermined quantity of fluid from the transfer zone operating as a high pressure zone, and maintaining the flow of fluid into and through said transfer zones at substantially constant velocity.

2. The method of transferring a slurry from one pressure level to a higher pressure level by means of a pressurized liquid which comprises continuously recycling a stream of liquid through a pressurizing zone, diverting the flow of said liquid from said pressurizing zone alternately and at regular intervals through two transfer zones of equal volume, returning said liquid from one transfer zone to said pressurizing zone while the other transfer zone is receiving liquid from said pressurizing zone, whereby each of said transfer zones operates successively as a low pressure zone and a high pressure zone, introducing a predetermined quantity of slurry into the transfer zone operating as a low pressure zone, concurrently discharging a corresponding predetermined quantity of slurry from the transfer zone operating as a high pressure zone, and maintaining the flow of said slurry into and through said transfer zones at substantially constant velocity and at sufficiently high velocity to retain the solids in suspension.

3. The method of increasing the pressure of a slurry being transported in a pipeline, which comprises continuously passing a liquid through a pressurizing zone, then through one of two transfer zones of equal volume back through said pressurizing zone, thence through the other transfer zone and back through said pressurizing zone to repeat the cycle, the flow of said liquid being at all times unidirectional through said pressurizing zone and said transfer zones, passing a slurry under low pressure from a pipeline into one of said transfer zones while pressurized liquid is being passed into the other of said transfer zones, and discharging slurry into a pipeline under high pressure from the transfer zone into which said pressurized liquid is being charged, the flow of said slurry into and through said transfer zones being at all times unidirectional and at substantially constant velocity.

4. The method of transferring a slurry by means of a pressurized liquid which comprises continuously recycling a stream of liquid through a pressurizing zone, directing said stream of pressurized liquid into one end of an elongated transfer zone until the latter is substantially filled therewith, then diverting said stream of pressurized liquid into the inlet end of another and corresponding transfer zone until the latter is substantially filled therewith, withdrawing said liquid from the opposite end of one transfer zone while the other transfer zone is being filled and returning it to said pressurizing zone, continually repeating the alternate and successive filling and discharging of the transfer zones whereby a continuous return of said liquid to said pressurizing zone is maintained, introducing a slurry into the inlet end of a transfer zone concurrently with the withdrawal of said liquid from the opposite end to fill the void otherwise established by said withdrawal, said slurry being thereafter discharged under pressure from said opposite end of said transfer zone upon the admittance of said pressurized liquid to the inlet end thereof, and maintaining the flow of slurry into and through said transfer zones at substantially constant velocity and at sufficiently high velocity to retain the solids in suspension.

5. The method of transporting solids through a pipeline which comprises suspending the solids in subdivided form in a liquid, introducing the resulting suspension into a pipeline, substantially continuously forming discrete slugs of said suspension of predetermined and equal volume, hydraulically pressurizing each of said slugs, maintaining a unidirectional flow of said suspension at substantially constant velocity during the formation and pressurizing of said slugs and thereafter recombining the pressurized slugs in a substantially continuous stream.

6. The method of transporting coal through a pipeline which comprises suspending the coal in subdivided form in water, introducing the resulting suspension into a pipeline, substantially continuously forming discrete slugs of said suspension of predetermined and equal volume, hydraulically pressurizing each of said slugs, maintaining a unidirectional flow of said suspension at substantially constant velocity during the formation and pressurizing of said slugs and thereafter recombining the pressurized slugs in a substantially continuous stream.

7. Pumping apparatus comprising, in combination, two transfer pipes of substantially the same length and internal diameter, a fluid pressurizing unit adapted to circulate a fluid continuously to said transfer pipes, means for alternately diverting predetermined but equal amounts of said fluid through said transfer pipes and back to said pressurizing unit, whereby said transfer pipes operate at any given time as a low pressure zone and a high pressure zone respectively, an inlet pipe and an outlet pipe of an internal diameter at least as large as that of said two transfer pipes, means for diverting a predetermined amount of a second fluid from said inlet pipe into the transfer pipe operating as the low pressure zone, and means for directing said second fluid into said outlet pipe from said transfer pipe while the latter is operating as a high pressure zone.

8. Pumping apparatus comprising, in combination, a liquid recirculatory system including two transfer pipes of substantially the same length and internal diameter, a liquid pressurizing unit adapted to circulate a liquid continuously to said transfer pipes, means for alternately diverting an amount of said liquid equal to the volume of one of said transfer pipes through said transfer pipes, means for continuously recycling said liquid to said pressurizing unit, whereby each transfer pipe operates successively as a low pressure zone and a high pressure zone; an inlet pipe and an outlet pipe of an internal diameter at least as large as that of said two transfer pipes, said inlet pipe being arranged to carry a second liquid to said transfer pipes and said outlet pipe being arranged to carry said second liquid away from said transfer pipes, means for diverting said second liquid from said inlet pipe into a transfer pipe during its period of operation as a low pressure zone in an amount insufficient to fill said transfer pipe, means for adding to said recirculatory system an amount of said first-mentioned liquid corresponding to that portion of said transfer pipe not filled with said second liquid during said period of operation as a low pressure zone, and means for directing the liquids contained in a transfer pipe at the end of its period of operation as a low pressure zone into said outlet pipe while said transfer pipe is operating as a high pressure zone.

9. Apparatus for transferring slurries comprising, in combination, a liquid recirculatory system having two transfer conduits of substantially the same dimensions, a pumping unit disposed in said recirculatory system and adapted to pump liquid, a high pressure conduit connected at one end to the high pressure side of said pumping unit and associated at the other end with the inlet ends of said two transfer conduits for conveying pressurized liquid thereto, a low pressure conduit connected at one end to the low pressure side of said pumping unit and associated at the other end with the outlet ends of said two transfer conduits, a slurry feed conduit associated with the inlet ends of said two transfer conduits for delivering slurry thereto, a slurry discharge conduit associated with the outlet ends of said two transfer conduits for receiving slurry discharged therefrom, a first valve associated with the inlet ends of said transfer conduits for concurrently directing the flow of pressurized liquid from said pumping unit to one of said transfer conduits and the flow of slurry from said slurry feed conduit to the other of said transfer conduits, a second valve associated with the outlet ends of said transfer conduits for concurrently establishing communication between one of said transfer conduits and said low pressure conduit and between the other of said transfer conduits and said slurry discharge conduit, and means for periodically actuating said first and second valves to permit slurry to be admitted to one of said transfer conduits while slurry is being discharged from the other of said transfer conduits.

10. Apparatus for raising the pressure of a first liquid by means of a second pressurized liquid which comprises, in combination, an inlet pipe section adapted to carry said first liquid, two transfer pipe sections of substantially the same length and internal diameter each of which has one end arranged to receive liquid directly from said inlet pipe section, an outlet pipe section arranged to receive liquid from said transfer pipe sections, the internal diameter of said inlet and outlet pipe sections being at least as large as that of said transfer pipe sections, a pressurizing pipe section adapted to carry said second liquid, means disposed in said pressurizing pipe section for continuously raising the pressure of liquid flowing therethrough, the high pressure side of said pressurizing pipe section being arranged to discharge said second liquid into the aforementioned ends of said transfer pipe sections, the low pressure side of said pressurizing pipe section being arranged to receive liquid from said transfer pipe sections, valve means associated with said pipe sections and adapted to direct the flow of said first liquid from said inlet pipe section into one of said transfer pipe sections and the return of said second liquid from that section to the low pressure side of said pressurizing pipe section while concurrently directing the flow of said second liquid from the high pressure side of said pressurizing pipe section into the other of said transfer pipe sections and the flow of said first liquid out of that section into said outlet pipe section, and control means for periodically actuating said valve means to alternately divert the flow of said first liquid to said transfer pipe sections.

11. A pumping apparatus comprising in combination, a low pressure inlet pipe, a high pressure outlet pipe, two transfer pipe sections of substantially the same internal diameter and length, each of which has an inlet end associated with said low pressure inlet pipe for receiving fluid therefrom when operatively connected thereto, and each of which has an outlet end associated with said high pressure outlet pipe for discharging fluid thereinto when operatively connected thereto, a third pipe section one end of which is associated with the inlet ends of said transfer pipe sections for discharging high pressure liquid thereinto when operatively connected thereto and the other end of which is associated with the outlet ends of said transfer pipe sections for receiving low pressure liquid therefrom when operatively connected thereto, means disposed in said third pipe section for continuously pressurizing the liquid flowing therethrough, first valve means arranged to direct the flow of low pressure fluid from said inlet pipe to one of said transfer pipe sections and simultaneously therewith to direct the flow of high pressure liquid from said third pipe section to the other of said transfer pipe sections, second valve means arranged to direct the flow of high pressure fluid from one of said transfer pipe sections into said high pressure outlet pipe and simultaneously therewith to direct the flow of low pressure liquid from the other of said transfer pipe sections to said third pipe section, and control means associated with said first and second valve means for periodically and simultaneously actuating said valve means to permit the introduction of fluid from said low pressure inlet pipe into one of said transfer pipe sections and the concurrent discharge of previously introduced fluid from the other of said sections into said high pressure outlet pipe.

12. A pumping apparatus comprising in combination, a low pressure inlet pipe, a high pressure outlet pipe, two transfer pipe sections of substantially the same internal diameter and length, each of which has an inlet end associated with said low pressure inlet pipe for receiving fluid therefrom when operatively connected thereto, and each of which has an outlet end associated with said high pressure outlet pipe for discharging fluid thereinto when operatively connected thereto, a third pipe section one end of which is associated with the inlet ends of said transfer pipe sections for discharging high pressure liquid thereinto when operatively connected thereto and the other end of which is associated with the outlet ends of said transfer pipe sections for receiving low pressure liquid therefrom when operatively connected thereto, means disposed in said third pipe section for continuously pressurizing the liquid flowing therethrough, first valve means arranged to direct the flow of low pressure fluid from said inlet pipe to either of said transfer pipe sections, second valve means arranged to direct the flow of high pressure liquid from said third pipe section to either of said transfer pipe sections, third valve means arranged to direct the flow of high pressure fluid from either of said transfer pipe sections into said high pressure outlet pipe, fourth valve means arranged to direct the flow of low pressure liquid from either of said transfer pipe sections to said third pipe section, and control means associated with said four valve means for periodically and simultaneously actuating said valve means to permit the introduction of fluid from said low pressure inlet pipe into one transfer pipe section while low pressure liquid is being returned from said transfer section to said third pipe section, and the introduction of high pressure liquid from said third pipe section into the other transfer section while high pressure fluid is being discharged into said high pressure outlet pipe.

13. A pumping apparatus comprising in combination, a low pressure inlet pipe, a high pressure outlet pipe, two transfer pipe sections of substantially the same internal diameter and length, each of which has an inlet end associated with said low pressure inlet pipe for receiving fluid therefrom when operatively connected thereto and each of which has an outlet end associated with said high pressure outlet pipe for discharging fluid thereinto when operatively connected thereto, a third pipe section one end of which is associated with the inlet ends of said transfer pipe sections for discharging high pressure liquid thereinto when operatively connected thereto and the other end of which is associated with the outlet ends of said transfer pipe sections for receiving low pressure liquid therefrom when operatively connected thereto, means disposed in said third pipe section for continuously pressurizing the liquid flowing therethrough, first and second valves arranged when one is open and the other closed to direct the flow of low pressure fluid from said inlet pipe to one of said transfer pipe sections, third and fourth valves arranged when one is open and the other closed to direct the flow of high pressure liquid from said third pipe section to one of said transfer pipe sections, fifth and sixth valves arranged when one is open and the other closed to direct the flow of pressure liquid from one of said transfer pipe sections to said third pipe section, seventh and eighth valves arranged when one is open and the other closed to direct the flow of high pressure fluid from one of said transfer pipe sections into said high pressure outlet pipe, and control means associated with said eight valves for periodically and simultaneously actuating said valves to permit the introduction of fluid from said low pressure inlet pipe into one transfer pipe section while low pressure liquid is being returned from said transfer section to said third pipe section and the introduction of high pressure liquid from said third pipe section into the other transfer section while high pressure fluid is being discharged into said high pressure outlet pipe.

14. A pumping apparatus comprising in combination, a low pressure inlet pipe, a high pressure outlet pipe, two transfer pipe sections of substantially the same internal diameter and length, each of which has an inlet end associated with said low pressure inlet pipe for receiving fluid therefrom when operatively connected thereto and each of which has an outlet end associated with said high pressure outlet pipe for discharging fluid thereinto when operatively connected thereto, a third pipe section one end of which is associated with the inlet ends of said transfer pipe sections for discharging high pressure liquid thereinto when operatively connected thereto and the other end of which is associated with the outlet ends of said transfer pipe sections for receiving low pressure liquid therefrom when operatively connected thereto, means disposed in said third pipe section for continuously pressurizing the liquid flowing therethrough, first and second valves arranged when one is open and the other closed to direct the flow of low pressure fluid from said inlet pipe to one of said transfer pipe sections, third and fourth valves arranged when one is open and the other closed to direct the flow of high pressure liquid from said third pipe section to one of said transfer pipe sections, fifth and sixth valves arranged when one is open and the other closed to direct the low pressure liquid from one of said transfer pipe sections to said third pipe section, seventh and eighth valves arranged when one is open and the other closed to direct the flow of high pressure fluid from one of said transfer pipe sections into said high pressure outlet pipe, control means associated with said eight valves for periodically actuating said valves to permit the introduction of fluid from said low pressure inlet pipe into one transfer pipe section while low pressure liquid is being returned from said transfer section to said third pipe section, and the introduction of high pressure liquid from said third pipe section into the other transfer section while high pressure fluid is being discharged into said high pressure outlet pipe, and means for momentarily circulating a small quantity of said liquid at high pressure through either of said first and second valves countercurrent to the flow of low pressure fluid therethrough and immediately prior to the change of said valve from an open to a closed position.

SAM A. JONES.
ERIC H. REICHL.

References Cited in the file of this patent

UNITED STATES PATENTS

| Number | Name | Date |
|---|---|---|
| 616,537 | Horrigmann | Dec. 27, 1898 |
| 1,605,196 | Ligon | Nov. 2, 1926 |
| 1,798,061 | Brost | Mar. 24, 1931 |